United States Patent
Zou et al.

(10) Patent No.: US 9,769,736 B2
(45) Date of Patent: Sep. 19, 2017

(54) METHOD, DEVICE AND SYSTEM FOR SELECTING SELF-ORGANIZING NETWORK FUNCTION

(71) Applicant: Huawei Technologies Co., Ltd., Shenzhen, Guangdong (CN)

(72) Inventors: Lan Zou, Shenzhen (CN); Haitao Xia, Shenzhen (CN); Kai Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 175 days.

(21) Appl. No.: 14/524,588

(22) Filed: Oct. 27, 2014

(65) Prior Publication Data

US 2015/0043432 A1 Feb. 12, 2015

Related U.S. Application Data

(63) Continuation of application No. PCT/CN2013/074354, filed on Apr. 18, 2013.

(30) Foreign Application Priority Data

Apr. 28, 2012 (CN) .......................... 2012 1 0132070

(51) Int. Cl.
*H04W 16/10* (2009.01)
*H04W 48/16* (2009.01)
(Continued)

(52) U.S. Cl.
CPC ........... *H04W 48/16* (2013.01); *H04W 16/10* (2013.01); *H04W 24/02* (2013.01); *H04W 84/18* (2013.01)

(58) Field of Classification Search
CPC ..... H04W 48/16; H04W 84/18; H04W 24/02; H04W 16/10
See application file for complete search history.

(56) References Cited

U.S. PATENT DOCUMENTS

2011/0171930 A1* 7/2011 Yoon ................ H04W 52/0216
455/405
2012/0213057 A1 8/2012 Zhang et al.
(Continued)

FOREIGN PATENT DOCUMENTS

CN 101110740 A 1/2008
CN 101959219 A 1/2011
(Continued)

OTHER PUBLICATIONS

"3$^{rd}$ Generation Partnership Project; Technical Specification Group Services and System Aspects; Telecommunication Management; Self-Organizing Networks (SON) Policy Network Resource Model (NRM) Integration Reference Point (IRP); Information Service (IS) (Release 11)," 3GPP TS 32.522, V11.1.0, pp. 1-32, 3$^{rd}$ Generation Partnership Project, Valbonne, France (Dec. 2011).

(Continued)

*Primary Examiner* — Andrew Lai
*Assistant Examiner* — M Mostazir Rahman
(74) *Attorney, Agent, or Firm* — Leydig, Voit & Mayer, Ltd.

(57) ABSTRACT

The present invention provides a method, a device, and a system for selecting a self-organizing network (SON) function. The method comprises: an SON function selecting entity receives SON capability information of an SON functional entity, the SON capability information of the SON functional entity comprising: an SON capability supported by the SON functional entity and an activated state of the SON capability supported by the SON functional entity; the SON function selecting entity acquires an SON function selecting policy; the SON function selecting entity performs SON function selection according to the SON capability information of the SON functional entity and the SON function selecting policy. The technical solutions provided (Continued)

by the present invention are applicable to the field of communications, and solve the problem in the prior art that during the operation of SON function coordination, execution conflicts occur among functional instances.

12 Claims, 7 Drawing Sheets

(51) Int. Cl.
  *H04W 24/02* (2009.01)
  *H04W 84/18* (2009.01)

(56) References Cited

U.S. PATENT DOCUMENTS

| | | | |
|---|---|---|---|
| 2013/0252660 A1* | 9/2013 | Bach | H04W 52/0206 455/525 |
| 2013/0339522 A1 | 12/2013 | Li et al. | |

FOREIGN PATENT DOCUMENTS

| | | |
|---|---|---|
| CN | 101969647 A | 2/2011 |
| CN | 102056206 A | 5/2011 |
| CN | 102056336 A | 5/2011 |
| EP | 2410783 A1 | 1/2012 |

OTHER PUBLICATIONS

"3$^{rd}$ Generation Partnership Project; Technical Specification Group Services and System Aspects; Telecommunication Management; Software Management (SwM); Integration Reference Point (IRP); Information Service (IS) (Release 10)," 3GPP TS 32.532, V10.1.0, pp. 1-47, 3$^{rd}$ Generation Partnership Project, Valbonne, France (Dec. 2010).

"3$^{rd}$ Generation Partnership Project; Technical Specification Group Services and System Aspects; Telecommunication Management; Configuration Management (CM); UTRAN Network Resources Integration Reference Point (IRP); Network Resource Model (NRM) (Release 11)," 3GPP TS 32.642, V11.1.0, pp. 1-49, 3$^{rd}$ Generation Partnership Project, Valbonne, France (Mar. 2012).

"3$^{rd}$ Generation Partnership Project; Technical Specification Group Services and System Aspects; Telecommunication Management; Evolved Universal Terrestrial Radio Access Network (E-UTRAN) Network Resource Model (NRM) Integration Reference Point (IRP); Information Service (IS) (Release 11)," 3GPP TS 32.762, V11.1.0, pp. 1-56, 3$^{rd}$ Generation Partnership Project, Valbonne, France (Mar. 2012).

"3$^{rd}$ Generation Partnership Project; Technical Specification Group Radio Access Network; Evolved Universal Terrestrial Radio Access Network (E-UTRAN); S1 Application Protocol (S1AP) (Release 10)," 3GPP TS 36.413, V10.5.0, pp. 1-255, 3$^{rd}$ Generation Partnership Project, Valbonne, France (Mar. 2012).

"3$^{rd}$ Generation Partnership Project; Technical Specification Group Radio Access Network; Evolved Universal Terrestrial Radio Access Network (E-UTRAN); X2 Application Protocol (X2AP) (Release 11)," 3GPP TS 36.423, V11.0.0, pp. 1-134, 3$^{rd}$ Generation Partnership Project, Valbonne, France (Mar. 2012).

"SON Coordination: Conflicts and Their Categorization," 3GPP TSG SA WG5 (Telecom Management) Meeting #80, San Francisco, California, S5-113659, 3$^{rd}$ Generation Partnership Project, Valbonne, France (Nov. 14-18, 2011).

"Discussion on Fetching SON Capability Information in Coordination," 3GPP TSG SA WG5 (Telecom Management) Meeting #84, Berlin, Germany, 3$^{rd}$ Generation Partnership Project, Valbonne, France (Aug. 20-24, 2012).

* cited by examiner

METHOD, DEVICE AND SYSTEM FOR SELECTING SELF-ORGANIZING NETWORK FUNCTION

CROSS-REFERENCE TO RELATED APPLICATIONS

This application is a continuation of International Patent Application No. PCT/CN2013/074354, filed on Apr. 18, 2013, which claims priority to Chinese Patent Application No. 201210132070.3, filed on Apr. 28, 2012, both of which are hereby incorporated by reference in their entireties.

TECHNICAL FIELD

The present invention relates to the technical field of communications, and in particular to a method, a device and a system for selecting a self-organizing network function.

BACKGROUND

Self Organizing Network (Self Organizing Network, SON) is a key topic research of standardization carried out by the 3rd Generation Partnership Project (3rd Generation Partnership Project, 3GPP) standard organization during the R8/9/10 working period, and the core concept thereof is to reduce conventional manual operations and reduce the operation and maintenance cost of network operators through automation processes at the stages of network planning, deployment, optimization and maintenance.

The SON itself integrates multiple automatic functions, including a Self Configuration (Self Configuration), an Automatic Neighboring Relation (Automatic Neighboring Relation, ANR), a Mobility Robustness Optimization (Mobility Robustness Optimization, MRO), a Mobility Load Balancing (Mobility Load Balancing), a Coverage and Capacity Optimization (Coverage and Capacity Optimization, CCO), a Cell Outage Detection and Compensation (Cell Outage Detection and Compensation, CODC), a cell Energy Saving (Energy Saving, ES). In practice, multiple SON functions rather than one SON function cooperate with each other to achieve one purpose, for addressing a network problem (e.g., debugging) or optimizing the network. This may cause an issue of how to coordinate the cooperating SON functions, i.e., how to avoid the different SON functions from performing conflict operations, setting conflict parameters or generating contradictory targets on one network entity (e.g., a base station, a cell).

There are some methods to coordinate SON functions in the conventional technology. The methods include: a conflict avoidance method (a prior SON function coordination, i.e., determining a possible executing conflict and optimizing an executing sequence of multiple SON functions before executing the SON functions, to avoid such a conflict before execution) and a conflict resolution method (a posterior SON function coordination, i.e., addressing by setting a task priority a conflict that occurs in executing the multiple SON functions). In the process of coordinating SON functions, each entity supporting SON functions (e.g., a base station, or an operation and maintenance system, i.e., a network management system) only knows about its own SON function configuration but knows nothing about SON function configurations of surrounding entities. In this case, an executing conflict occurs between a SON function of an entity and SON functions of surrounding entities if the SON function of the entity is configured as the same as those of the surrounding entities or the SON function of the entity is configured as different from those of the surrounding entities but a conflict relation is preset between the SON functions of the entity and its surrounding entities.

SUMMARY

In summary, in the conventional technology, a function entity participating in an SON coordination can not learn SON capability information of its surrounding SON function entities or SON capability information of the SON function entities distributed in its management domain (in a case that the entity for coordinating SON functions is the network management system). The lack of SON capability information may result in an executing conflict between the SON functions of different entities participating in the SON function coordination in the level of use case, which does not involves the specific optimization, configuration parameters and optimization objects in the use case, thereby affecting the cooperation of the SON functions.

It is to provide a method, a device and a system for selecting a self-organizing network SON function, to solve the problem existing in the conventional technology that an entity supporting an SON function can not learn SON capability information of surrounding entities.

In one aspect, a method for selecting a self-organizing network SON function is provided according to an embodiment of the invention, including: receiving, by an SON function selecting entity, SON capability information of an SON function entity, where the SON capability information of the SON function entity includes an SON capability supported by the SON function entity and an activation state of the SON capability supported by the SON function entity; acquiring, by the SON function selecting entity, an SON function selection policy; and selecting, by the SON function selecting entity, an SON function based on the SON capability information of the SON function entity and the SON function selection policy.

In another aspect, a self-organizing network SON function selection entity is further provided according to an embodiment of the invention, including: a receiving unit, configured to receive SON capability information of an SON function entity sent by the SON function entity, where the SON capability information of the SON function entity includes an SON capability supported by the SON function entity and an activation state of the SON capability supported by the SON function entity; an acquisition unit, configured to acquire an SON function selection policy; and a selecting unit, configured to select an SON function based on the SON capability information of the SON function entity received by the receiving unit and the SON function selection policy acquired by the acquisition unit.

In another aspect, a self-organizing network SON function selection system is further provided according to an embodiment of the invention, including the SON function selection entity and at least one SON function entity.

By the foregoing technical solutions, the SON function selection entity receives SON capability information of an SON function entity, acquires an SON function selection policy, and selects an SON function based on the SON capability information and the SON function selection policy. In this way, the SON function selection entity can learn the SON capability information of the SON function entity, which facilitates the cooperation between the SON function selection entity and the SON function, thereby addressing the executing conflict among functional use cases in cooperation of the SON functions in the conventional technology.

DESCRIPTION OF EMBODIMENTS

The disclosure may be specified hereinafter in conjunction with drawings and embodiments, to make the object, technical solutions and advantages of the disclosure to be better understood. It may be understood that, the embodiments are only to illustrate the disclosure rather than to limit the disclosure.

Embodiment 1

Figure 1:
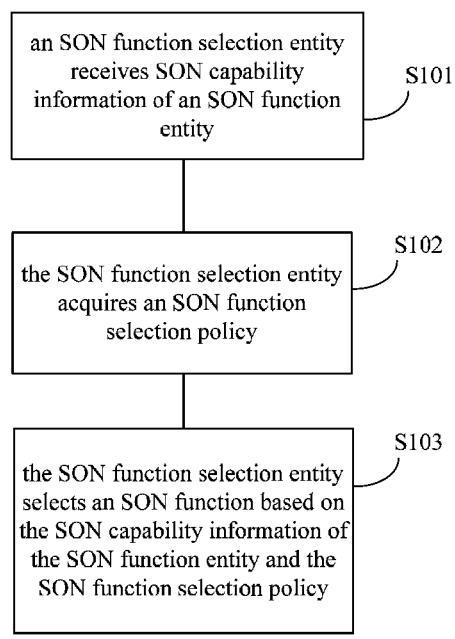
FIG. 1 is a flow chart of a method for selecting a self-organizing network SON function according to an embodiment of the invention.

FIG. 1 is a flow chart of a method for selecting an SON capability according to an embodiment of the invention. The method includes S101 to S103.

In S101, an SON function selection entity receives SON capability information of an SON function entity. The SON capability information of the SON function entity includes an SON capability supported by the SON function entity and an activation state of the SON capability supported by the SON function entity.

In the embodiment of the invention, the SON capability includes a centralized (centralized) SON function and/or a distributed (distributed) SON function. The centralized SON function includes a Network Management-centralized (Network Management-centralized, NM-centralized) SON function and/or an Element Management-centralized (Element Management-centralized, EM-centralized) SON function. In an implementation, the operator may determine an executing scheme of SON functions of SON function entities based on an overall target of SON functions, a network planning and historical operation data i.e., make a choice between the centralized SON function and the distributed SON function, and record an SON function selection policy into an Integration Reference Point Manager (Integration Reference Point Manager, IRPManager).

The centralized SON function may include: a centralized CCO, a centralized ES, a centralized ANR, a centralized MRO, a centralized MLB and a centralized Inter-Cell Interference Control (Inter-Cell Interference Control, ICIC). The distributed SON function may include a distributed CCO, a distributed ES, a distributed ANR, a distributed MRO, a distributed MLB, a distributed Random Access Channel (Random Access Channel, RACH) optimization and a distributed ICIC.

In the SON function information of the SON function entity, the SON capability supported by the SON function entity (e.g., SON Capability Name) refers to the specific SON capability supported by the SON function entity, such as the centralized CCO, the centralized ES, the centralized ANR, the centralized MRO, the centralized MLB, the centralized ICIC, the distributed CCO, the distributed ES, the distributed ANR, the distributed MRO, the distributed MLB, the distributed RACH optimization and the distributed ICIC. The activation state of the SON capability supported by the SON function entity (e.g., SON Capability Activated) refers to indication information of the activation state of the SON capability supported specifically by the SON function entity, i.e., indicating whether an SON capability is currently activated on the SON function entity.

In S102, the SON function selection entity acquires an SON function selection policy.

In S103, the SON function selection entity selects an SON function based on the SON capability information of the SON function entity and the SON function selection policy.

In the embodiment of the invention, the SON function selection entity selects the SON function based on the SON capability information of the SON function entity and the SON function selection policy, thereby disabling those SON functions which may result in a possible executing conflict before SON cooperation.

In the embodiment of the invention, the SON function selection entity receives the SON capability information of the SON function entity, acquires the SON function selection policy, and selects an SON function based on the SON capability information and the SON function selection policy, so that the SON function selection entity can learn the SON capability information of the SON function entity, which facilitates the cooperation between the SON function selection entity and the SON function entity, thereby addressing executing conflict among functional use cases in cooperation of the SON functions in the conventional technology.

In an implementation, the SON function selection entity and the SON function entity may be different network elements or management systems in different scenarios, for example:

scenario 1: the SON function selection entity is a first base station, and the SON function entity is a second base station;

scenario 2: the SON function selection entity is an IRP-Manager, and the SON function entity is a base station;

scenario 3: the SON function selection entity is an IRP-Manager, and the SON function entity is an Integration Reference Point Agent (Integration Reference Point Agent, IRPAgent);

scenario 4: the SON function selection entity is an IRP-Manager, and the SON function entity includes an IRPAgent and a base station;

scenario 5: the SON function selection entity is an IRPAgent, and the SON function entity is a base station.

The method for selecting the SON capability in the foregoing different scenarios may be described respectively hereinafter.

Embodiment 2

Figure 2:
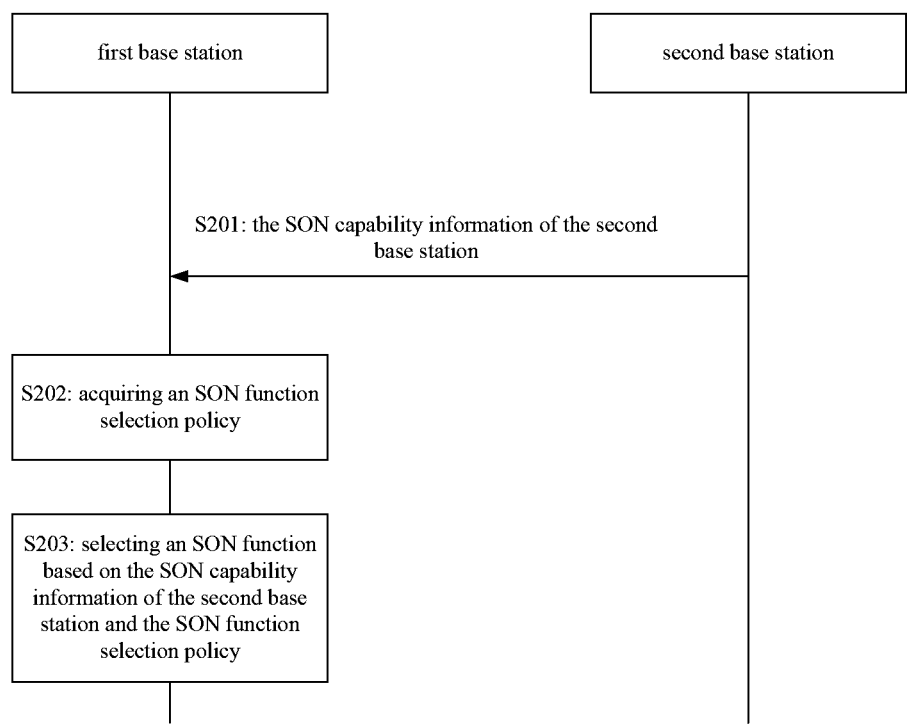
FIG. 2 is a flow chart of a method for selecting a self-organizing network SON function according to another embodiment of the invention.

As shown in FIG. 2, a method for selecting an SON capability in scenario 1 is provided according to this embodiment. The SON function selection entity is a first base station, and the SON function entity is a second base station. The method includes S201 to S203.

In S201, the first base station receives SON capability information of the second base station sent by the second base station. The SON capability information of the second base station includes an SON capability supported by the second base station and an activation state of the SON capability supported by the second base station.

In an implementation, the SON capability supported by the second base station (e.g., SON Capability Name) refers to the specific SON capability of the second base station supporting SON function, such as a distributed CCO, a distributed ES, a distributed ANR, a distributed MRO, a distributed MLB, a distributed RACH optimization and a distributed ICIC. The activation state of the SON capability supported by the second base station (e.g., SON Capability Activated) refers to indication information of the activation state of the SON capability, i.e., indicating whether an SON capability is currently activated on the base station.

In the embodiment of the invention, the first base station receiving the SON capability information of the second base station sent by the second base station includes: the first base station receiving the SON capability information of the second base station sent by the second base station via an X2 interface setup process, via a base station configuration update process, or via a mobility management entity configuration update process. The three processes are described hereinafter.

a. In the X2 interface setup process, the second base station after being powered on initially detects a network via an existing self-establishing process and establishes an initial connection with the first base station and an OAM system in the network, and the self-established second base station sends the SON capability information to the first base station in the X2 Setup process so that the first base station can receive the SON capability information of the second base station.

b. In the base station configuration update process, i.e., eNB Configuration Update process, the second base station sends updated SON capability information to the first base station in the base station configuration update process at the X2 interface in a case that the SON capability information of the second base station is changed.

c. In the mobility management entity configuration update process, i.e., MME Configuration Update process, the second base station sends updated SON capability information to an MME in a base station configuration update process at an S1 interface in a case that the SON capability information of the second base station is changed, and the MME sends the updated SON capability information to the first base station in the mobility management entity configuration update process at the 51 interface.

In S202, the first base station acquires an SON function selection policy.

In the embodiment of the invention, the first base station acquiring the SON function selection policy includes: the first base station receiving the SON function selection policy which is preset and sent by an IRPAgent, or receiving the SON function selection policy which is preset by an IRPManager and forwarded by an IRPAgent.

In S203, the first base station selects an SON function based on the SON capability information of the second base station and the SON function selection policy.

In the embodiment of the invention, the first base station selects the SON capability based on the SON capability information of the second base station and the SON function selection policy, thereby disabling the SON function which may result in a possible executing conflict before SON cooperation.

In the technical solution of the embodiment of the invention, the first base station receives the SON capability information of the second base station, acquires the SON function selection policy, and selects an SON function based on the SON capability information of the second base station and the SON function selection policy, so that the first base station learns the SON capability information of the second base station, which facilitates the cooperation between the first base station and the second base station, thereby addressing the executing conflict among functional use cases in cooperation of the SON functions in the conventional technology.

Embodiment 3

Figure 3:
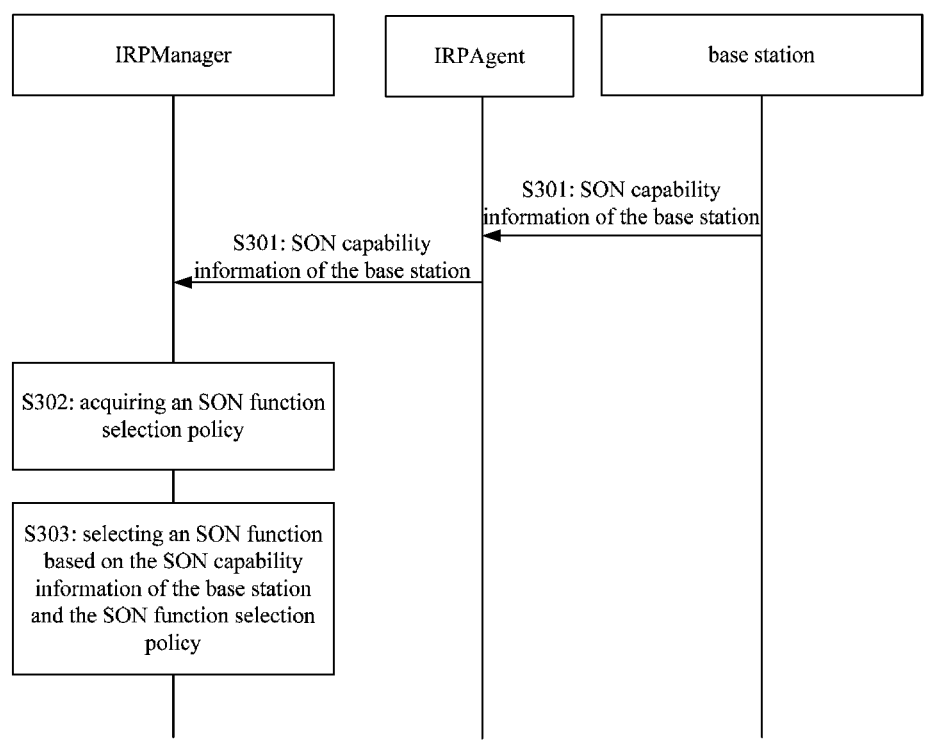
FIG. 3 is a flow chart of a method for selecting a self-organizing network SON function according to another embodiment of the invention.

As shown in FIG. 3, a method for selecting an SON capability in scenario 2 is provided according to this embodiment of the invention. The SON function selection entity is an IRPManager, and the SON function entity is a base station. The method includes S301 to S303.

In S301, the IRPManager receives SON capability information of the base station sent by an IRPAgent. The SON capability information of the base station includes an SON capability supported by the base station and an activation state of the SON capability supported by the base station.

In an implementation, the SON capability supported by the base station (e.g., SON Capability Name) refers to the specific SON capability of the base station supporting SON function, such as a centralized CCO, a centralized ES, a centralized ANR, a centralized MRO, a centralized MLB and a centralized ICIC. The activation state of the SON capability supported by the base station (e.g., SON Capability Activated) refers to indication information of the activation state of the SON capability, i.e., indicating whether an SON capability is currently activated on the base station.

In the embodiment, the IRPManager receiving the SON capability information of the base station sent by the IRPAgent includes: the base station sending, on its own initiative, the SON capability information to the IRPManager via the IRPAgent in a self-establishing process of the base station, or the IRPManager acquiring the SON capability information of the base station by subscribing a notification, subscribing a log or creating a trace task.

In S302, the IRPManager acquires an SON function selection policy.

In the embodiment of the invention, the IRPManager acquiring the SON function selection policy includes: the IRPManager acquiring an SON function selection policy preset by an operator in the IRPManager.

In S303, the IRPManager selects an SON function based on the SON capability information of the base station and the SON function selection policy.

In the embodiment of the invention, the IRPManager selects the SON function based on the SON capability information of the base station and the SON function selection policy, thereby disabling the SON function which may result in a possible executing conflict before SON cooperation.

The SON function selection policy in this embodiment is illustrated as follows.

1. The IRPManager enables the SON function to be executed coordinately in the base station, as follows. In a use case of enabling/disabling ES in a cell, both a base station that an energy-saving cell belonging to (e.g., eNB1) and a base station that a cell providing a coverage support for the energy-saving cell belonging to (e.g., eNB2) need to enable the ES function. In the case that the SON capability information reported by the eNB 1 indicates that the ES capability is configured and the function is activated and the SON capability information reported by the eNB2 indicates that the ES capability is configured and the function is not activated, the IRPManager sends a message to the eNB2 via an IRPAgent to instruct the eNB2 to enable the ES function so that the eNB2 can perform the ES function.

2. The IRPManager disables the SON function which has a potential executing conflict, as follows. A base station A initiates an MRO process, and if the base station A can learn capability information of an adjacent base station B, for example, the base station B also initiates an MRO process or initiates an ICIC process, the base station A can determine which SON capability may affect the MRO process of the base station A based on the SON capabilities initiated by the base station B (for example, the ICIC function of the base station B is to reduce a transmitting carrier frequency power of the base station B to reduce intra-frequency interference of cells, which affects an adjustment of a mobility parameter of a MRO function of the base station A). If a selection policy, which defines that the ICIC function is disabled in a cell adjacent to the base station A in a case that a cell of the base station A initiates the MRO process, is configured in the IRPManager, the IRPManager may disable, via the IRPAgent, the activated ICIC function of the base station B which is adjacent to the base station A based on the preset selection policy, after the SON capability information supported by the cell of the base station A and by the adjacent cell of the base station B is reported to the IRPManager.

In the embodiment of the invention, the IRPManager receives the SON capability information of the base station, acquires the SON function selection policy, and selects an SON function based on the SON capability information and the SON function selection policy, so that the IRPManager learns the SON capability information of the base station, which facilitates the cooperation between the IRPManager and the base station, thereby addressing the executing conflict among functional use cases in cooperation of the SON functions in the conventional technology.

Embodiment 4

Figure 4:
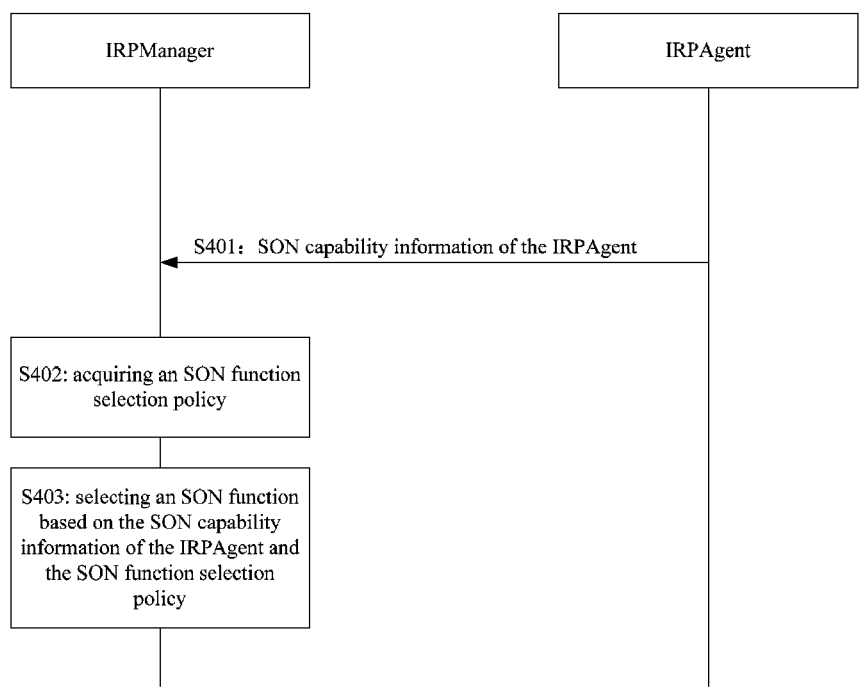
FIG. 4 is a flow chart of a method for selecting a self-organizing network SON function according to another embodiment of the invention.

As shown in FIG. 4, a method for selecting an SON capability in scenario 3 is provided according to this embodiment. The SON function selection entity is an IRP-Manager, and the SON function entity is an IRPAgent. The method includes S401 to S403.

In S401, the IRPManager receives SON capability information of the IRPAgent sent by the IRPAgent. The SON capability information of the IRPAgent includes an SON capability supported by the IRPAgent and an activation state of the SON capability supported by the IRPAgent.

In an implementation, the SON capability supported by the IRPAgent (e.g., SON Capability Name) refers to the specific SON capability of the IRPAgent supporting SON function, such as a centralized COO, a centralized ES, a centralized ANR, a centralized MRO, a centralized MLB and a centralized ICIC. The activation state of the SON capability supported by the IRPAgent (e.g., SON Capability Activated) refers to indication information of the activation state of the SON capability, i.e., indicating whether the SON capability is currently activated on the IRPAgent.

In the embodiment, the IRPManager receiving the SON capability information of the IRPAgent sent by the IRPAgent includes: the IRPAgent sending, on its own initiative, the SON capability information to the IRPManager in a self-establishing process, or the IRPManager acquiring the SON capability information of the IRPAgent by subscribing a notification, subscribing a log or creating a trace task.

In S402, the IRPManager acquires an SON function selection policy.

In the embodiment of the invention, the IRPManager acquiring the SON function selection policy includes: the IRPManager acquiring the SON function selection policy preset by an operator in the IRPManager.

In S403, the IRPManager selects an SON function based on the SON capability information of the IRPAgent and the SON function selection policy.

In the embodiment of the invention, the IRPManager selects the SON function based on the SON capability information of the IRPAgent and the SON function selection policy, thereby disabling the SON function which may result in a possible executing conflict before SON cooperation.

In the embodiment of the invention, the IRPManager receives the SON capability information of the IRPAgent, acquires the SON function selection policy, and selects an SON function based on the SON capability information and the SON function selection policy, so that the IRPManager learns the SON capability information of the IRPAgent, which facilitates the cooperation between the IRPManager and the IRPAgent, thereby addressing the executing conflict among functional use cases in cooperation of the SON functions in the conventional technology.

Embodiment 5

Figure 5:
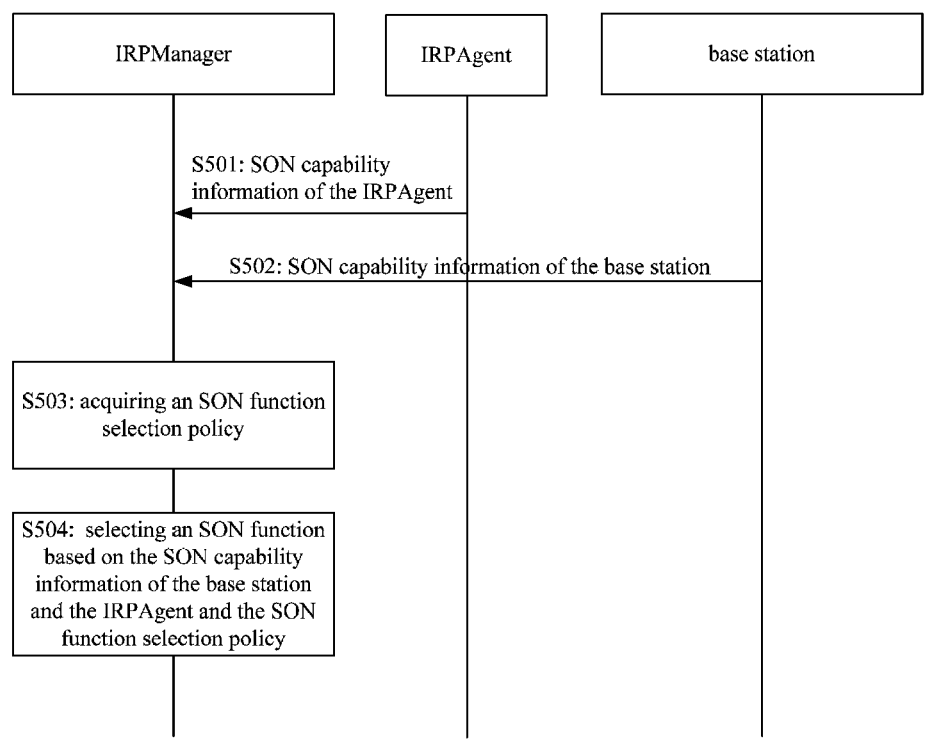
FIG. 5 is a flow chart of a method for selecting a self-organizing network SON function according to another embodiment of the invention.

As shown in FIG. 5, a method for selecting an SON capability in scenario 4 is provided according to this embodiment. The SON function selection entity is an IRP-Manager, and the SON function entity includes an IRPAgent and a base station. The method includes S501 to S504.

In S501, the IRPManager receives SON capability information of the IRPAgent sent by the IRPAgent. The SON capability information of the IRPAgent includes an SON capability supported by the IRPAgent and an activation state of the SON capability supported by the IRPAgent.

In an implementation, the SON capability supported by the IRPAgent (e.g., SON Capability Name) refers to the specific SON capability of the IRPAgent supporting SON function, such as a centralized COO, a centralized ES, a centralized ANR, a centralized MRO, a centralized MLB and a centralized ICIC. The activation state of the SON capability supported by the IRPAgent (e.g., SON Capability Activated) refers to indication information of the activation state of the SON capability, i.e., indicating whether the SON capability is currently activated on the IRPAgent.

In S502, the IRPManager receives SON capability information of the base station sent by the IRPAgent. The SON capability information of the base station includes an SON capability supported by the base station and an activation state of the SON capability supported by the base station.

In an implementation, the SON capability supported by the base station (e.g., SON Capability Name) refers to the specific SON capability of the base station supporting SON function, such as a centralized COO, a centralized ES, a centralized ANR, a centralized MRO, a centralized MLB and a centralized ICIC. The activation state of the SON capability supported by the base station (e.g., SON Capability Activated) refers to indication information of the activation state of the SON capability, i.e., indicating whether the SON capability is currently activated on the base station.

In the embodiment, the execution sequence of S501 and S502 is not limited.

In the embodiment, the IRPManager receiving the SON capability information of the IRPAgent and the SON capability information of the base station sent by the IRPAgent includes: the IRPAgent sending, on its own initiative, the SON capability information to the IRPManager in a self-establishing process, or the IRPManager acquiring the SON capability information of the IRPAgent by subscribing a notification, subscribing a log or creating a trace task.

In S503, the IRPManager acquires an SON function selection policy.

In the embodiment of the invention, the IRPManager acquiring the SON function selection policy includes: the IRPManager acquiring the SON function selection policy preset by an operator in the IRPManager.

In S504, the IRPManager selects an SON function based on the SON capability information of the base station, the SON capability information of the IRPAgent and the SON function selection policy.

The SON function selection policy in the embodiment is illustrated as follows: the IRPManager prohibits the same SON function configured in different entities from being executed simultaneously. For example, the IRPManager may be provided with an centralized ES function and the base station may be provided with a distributed ES function, then the IRPManager may enable the ES function of one entity and disable the ES function of another entity base on a certain policy after the IRPManager acquires the ES capability information of the IRPAgent and the base station.

In the embodiment of the invention, the IRPManager selects the SON function based on the SON capability information of the IRPAgent and the SON function selection policy, thereby disabling the SON function which may result in a possible executing conflict before SON cooperation.

In the embodiment of the invention, the IRPManager receives the SON capability information of the IRPAgent, acquires the SON function selection policy, and selects an SON function based on the SON capability information and the SON function selection policy, so that the IRPManager learns the SON capability information of the IRPAgent, which facilitates the cooperation between the IRPManager and the IRPAgent, thereby addressing the executing conflict among functional use cases in cooperation of the SON functions in the conventional technology.

In the foregoing Embodiments 3, 4 and 5, the IRPManager may send directly a request to the IRPAgent for acquiring the SON capability information of the base station and/or the IRPAgent in a case that the IRPManager is the SON function selection entity and the base station and/or the IRPAgent is the SON function entity. The process includes the steps as follows.

1. The IRPManager sends an acquisition request to the IRPAgent to acquire the SON capability information of a specified base station and/or IRPAgent;

2. The IRPAgent returns the current SON capability information of the base station and/or the IRPAgent based on the request of the IRPManager; and 3. The IRPManager determines, based on the SON capability information of multiple specified base stations and/or IRPAgents and in conjunction with the SON function selection policy configured in the IRPManager, whether to enable or disable some of the SON functions of the base stations and/or IRPAgents.

Embodiment 6

Figure 6:
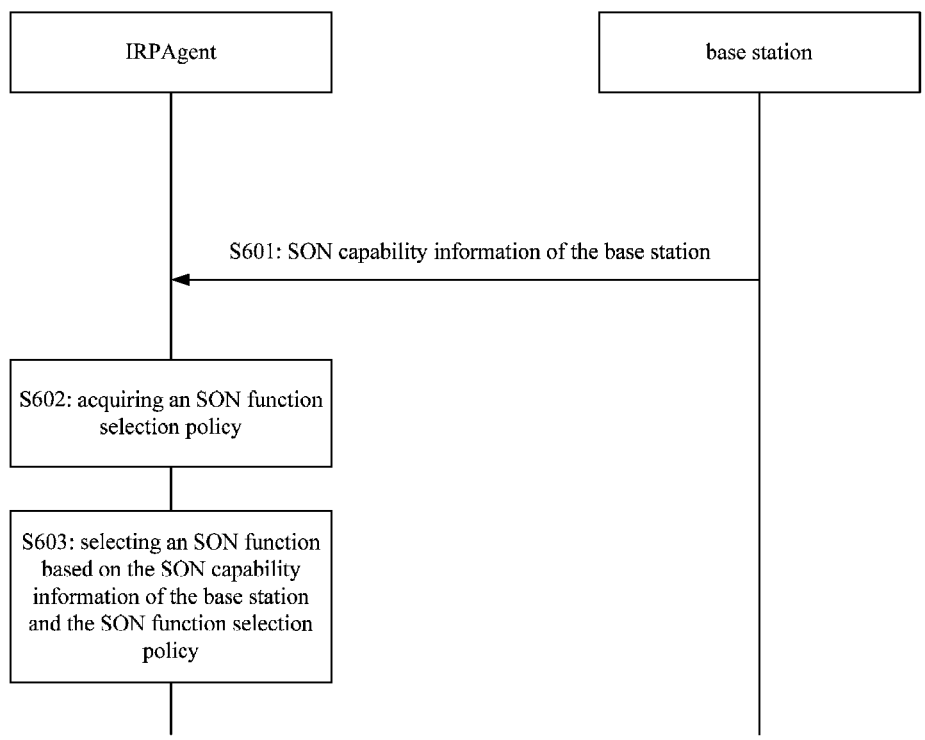
FIG. 6 is a flow chart of a method for selecting a self-organizing network SON function according to another embodiment of the invention.

As shown in FIG. 6, a method for selecting an SON capability in scenario 5 is provided according to this embodiment. The SON function selection entity is an IRPAgent, and the SON function entity is a base station. The method includes S601 to S603.

In S601, the IRPAgent receives SON capability information of the base station sent by the base station. The SON capability information of the base station includes an SON capability supported by the base station and an activation state of the SON capability supported by the base station.

In an implementation, the SON capability supported by the base station (e.g., SON Capability Name) refers to the specific SON capability of the base station supporting SON function, such as a centralized COO, a centralized ES, a centralized ANR, a centralized MRO, a centralized MLB and a centralized ICIC. The activation state of the SON capability supported by the base station (e.g., SON Capability Activated) refers to indication information of the activation state of the SON capability, i.e., indicating whether the SON capability is currently activated on the base station.

In S602, the IRPAgent acquires an SON function selection policy.

In the embodiment of the invention, the IRPAgent acquiring the SON function selection policy includes: the IRPAgent receiving the SON function selection policy set and sent by an IRPManager.

In S603, the IRPAgent selects an SON function based on the SON capability information of the base station and the SON function selection policy.

In the embodiment of the invention, the IRPAgent selects the SON function based on the SON capability information of the base station and the SON function selection policy, thereby disabling the SON function which may result in a possible executing conflict before SON cooperation.

In the technical solution of the embodiment of the invention, the IRPAgent receives the SON capability information of the base station, acquires the SON function selection policy, and selects an SON function based on the SON capability information and the SON function selection policy, so that the IRPAgent learns the SON capability information of the base station, which facilitates the cooperation between the IRPAgent and the base station, thereby addressing the executing conflict among functional use cases in cooperation of the SON functions in the conventional technology.

Embodiment 7

Figure 7:
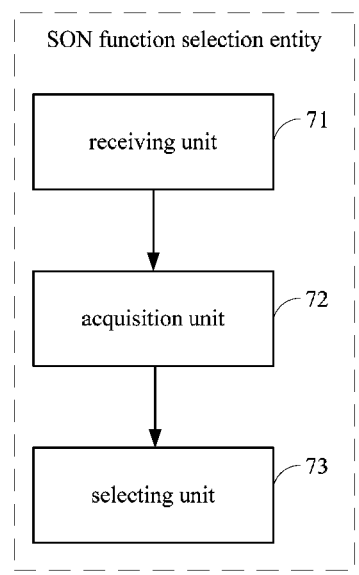
FIG. 7 is a structure diagram of a self-organizing network SON function selection entity according to an embodiment of the invention.

FIG. 7 is a structure diagram of a device for selecting a self-organizing network SON function provided according to this embodiment of the invention. For convenience of the description, only the part which is related to the embodiment is illustrated, including a receiving unit 71, an acquisition unit 72 and a selecting unit 73.

The receiving unit 71 is configured to receive SON capability information of an SON function entity. The SON capability information of the SON function entity includes an SON capability supported by the SON function entity and an activation state of the SON capability supported by the SON function entity.

In the embodiment of the invention, the SON capability in the capability information received by the receiving unit 71 includes a centralized SON function and/or a distributed SON function. The contents of the centralized SON function and the distributed SON function may refer to the description in Embodiment 1, and the detailed description thereof is omitted herein.

In the SON function information of the SON function entity, the SON capability supported by the SON function entity and the activation state of the SON capability supported by the SON function entity may refer to the description in Embodiment 1, and the detailed description is omitted herein.

The acquisition unit 72 is configured to acquire an SON function selection policy.

The selecting unit 73 is configured to select an SON function based on the SON capability information of the SON function entity received by the receiving unit 71 and the SON function selection policy acquired by the acquisition unit 72.

In the embodiment of the invention, the selecting unit 73 selects an SON function based on the SON capability information of the SON function entity received by the receiving unit 71 and the SON function selection policy acquired by the acquisition unit 72, thereby disabling the SON function which may result in a possible executing conflict before SON cooperation.

In an implementation, the SON function selection entity and the SON function entity may be different network elements in different scenarios, and illustrations of a few selectable scenarios are described in the following.

Scenario 1: the SON function selection entity is a first base station, and the SON function entity is a second base station.

In this scenario, the receiving unit 71 is further configured to receive SON capability information of the second base station sent by the second base station. The SON capability information of the second base station includes an SON capability supported by the second base station and an activation state of the SON capability. The acquisition unit 72 is further configured to receive an SON function selection policy which is preset and sent by an IRPAgent or receive the SON function selection policy which is preset by an IRPManager and forwarded by an Integration Reference Point Agent IRPAgent. The selecting unit 73 is further configured to select an SON function based on the SON capability information of the second base station received by the receiving unit 71 and the SON function selection policy acquired by the acquisition unit 72.

In this embodiment, the content of the SON capability information of the second base station received by the receiving unit 71 may refer to the content of the method embodiment 2, and the detailed description thereof is omitted herein. The method of receiving, by the first base station, the SON capability information of the second base station sent by the second base station may refer to the content of the method embodiment 2, and the detailed description thereof is omitted herein.

Scenario 2: the SON function selection entity is an IRPManager, and the SON function entity is a base station.

In this scenario, the receiving unit 71 is further configured to receive SON capability information of the base station sent by an IRPAgent. The SON capability information of the base station includes an SON capability supported by the base station and an activation state of the SON capability. The acquisition unit 72 is further configured to acquire an SON function selection policy preset by an operator in the IRPManager. The selecting unit 73 is further configured to select an SON function based on the SON capability information of the base station received by the receiving unit 71 and the SON function selection policy acquired by the acquisition unit 72.

Scenario 3: the SON function selection entity is an IRPManager, and the SON function entity is an IRPAgent.

In this scenario, the receiving unit 71 is further configured to receive SON capability information of the IRPAgent sent by the IRPAgent. The SON capability information of the IRPAgent includes an SON capability supported by the IRPAgent and an activation state of the SON capability supported by the IRPAgent. The acquisition unit 72 is further configured to acquire an SON function selection policy preset by an operator in the IRPManager. The selecting unit 73 is further configured to select an SON function based on the SON capability information of the IRPAgent received by the receiving unit 71 and the SON function selection policy acquired by the acquisition unit 72.

Scenario 4: the SON function selection entity is an IRPManager, and the SON function entity includes an IRPAgent and a base station.

In this scenario, the receiving unit 71 is further configured to receive SON capability information of the IRPAgent and SON capability information of the base station sent by the IRPAgent. The SON capability information of the IRPAgent includes an SON capability supported by the IRPAgent and an activation state of the SON capability supported by the IRPAgent. The SON capability information of the base station includes an SON capability supported by the base station and an activation state of the SON capability supported by the base station. The acquisition unit 72 is further configured to acquire an SON function selection policy preset by an operator in the IRPManager. The selecting unit 73 is further configured to select an SON function based on the SON capability information of the base station and the SON capability information of the IRPAgent received by the receiving unit 71 and the SON function selection policy acquired by the acquisition unit 72.

Scenario 5: the SON function selection entity is an IRPAgent, and the SON function entity is a base station.

In this scenario, the receiving unit 71 is further configured to receive SON capability information of the base station sent by the base station. The SON capability information of the base station includes an SON capability supported by the base station and an activation state of the SON capability. The acquisition unit 72 is further configured to receive an SON function selection policy preset and sent by an IRPManager. The selecting unit 73 is further configured to select an SON function based on the SON capability information of the base station received by the receiving unit 71 and the SON function selection policy acquired by the acquisition unit 72.

In the embodiment, the SON function selection entity selects an SON function based on the SON capability information of the SON function entity and the SON function selection policy, thereby disabling the SON function which may result in a possible executing conflict before SON cooperation.

The SON function selection entity in the embodiment receives the SON capability information of the SON function entity, acquires the SON function selection policy, and selects an SON function based on the SON capability information and the SON function selection policy, so that the SON function selection entity learns the SON capability information of the SON function entity, which facilitates the cooperation between the SON function selection entity and the SON function entity, thereby addressing the executing conflict among functional use cases in cooperation of the SON functions in the conventional technology.

Embodiment 8

A system for selecting a self-organizing network SON function is further provided according to an embodiment of the invention. The system includes the SON function selection entity as described in the embodiment 7 and at least one SON function entity.

The SON function selection entity may be the first base station in the scenario 1 of the embodiment 7, and the SON function entity may be the second base station.

Alternatively, the SON function selection entity may be the IRPManager in the scenario 2 of the embodiment 7, and the SON function entity may be the base station.

Alternatively, the SON function selection entity may be the IRPManager in the scenario 3 of the embodiment 7, and the SON function entity may be the IRPAgent.

Alternatively, the SON function selection entity may be the IRPManager in the scenario 4 of the embodiment 7, and the SON function entity may include the IRPAgent and the base station.

Alternatively, the SON function selection entity may be the IRPAgent in the scenario 5 of the embodiment 7, and the SON function entity may be the base station.

In the embodiment, the SON function selection entity selects an SON function based on the SON capability information of the SON function entity and the SON function selection policy, thereby disabling the SON function which may result in a possible executing conflict before SON cooperation.

In the system provided by the embodiment, the SON function selection entity receives the SON capability information of the SON function entity, acquires the SON function selection policy, and selects an SON function based on the SON capability information and the SON function selection policy, so that the SON function selection entity learns the SON capability information of the SON function entity, which facilitates the cooperation between the SON function selection entity and the SON function entity, thereby addressing executing conflict among functional use cases in cooperation of the SON functions in the conventional technology.

It may be understood by those skilled in the art that a few or all of the procedures implementing the above method of the embodiments may be realized by instructing the related hardware via computer programs. The programs may be stored in a computer-readable storage medium. The programs, when being executed, include the procedures in the above method of embodiments. The storage medium may be a disk, an optical disk, a Read-Only Memory (Read-Only Memory, ROM) or a Random Access Memory (Random Access Memory, RAM).

The foregoing disclosure is only the preferable embodiments of the invention, which do not limit the protection scope of the invention. Those skilled in the art can understand a few or all of the procedures implementing the foregoing embodiments, and the equivalent variation made by those skilled in the art based on the claims of the invention fall into the protection scope of the invention.

What is claimed is:

1. A method for selecting a self-organizing network (SON) capability implemented by a base station, an integration reference point agent (IRPAgent) and a processor configured as an integration reference point manager (IRPManager), the method comprising:

receiving, by the IRPManager, SON capability information of the base station and the IRPAgent, wherein the SON capability information comprises a SON capability supported by the base station and the IRPAgent and an activation state of the SON capability indicating whether the SON capability is activated on the base station or the IRPAgent;

acquiring, by the IRPManager, a SON function selection policy;

determining, by the IRPManager, whether there is a conflict among the IRPManager, the base station and the IRPAgent based on the SON capability information of the base station, the SON capability information of the IRPAgent and the SON function selection policy; and selecting, by the IRPManager, a SON function based on the SON capability information of the base station, the SON capability information of the IRPAgent and the SON function selection policy when the IRPManager determines there is a conflict among the IRPManager, the base station and the IRPAgent.

2. The method according to claim 1, wherein the SON capability comprises a centralized SON function and/or a distributed SON function.

3. The method according to claim 2, wherein the centralized SON function comprises a centralized coverage and capacity optimization (CCO), a centralized energy saving (ES), a centralized automatic neighboring relation (ANR), a centralized mobility robustness optimization (MRO), a centralized mobility load balancing (MLB) and a centralized inter-cell interference control (ICIC).

4. The method according to claim 2, wherein the distributed SON function comprises a distributed CCO, a distributed ES, a distributed ANR, a distributed MRO, a distributed MLB, a distributed RACH optimization and a distributed ICIC.

5. An integration reference point manager (IRPManager) comprising a processor and a non-transitory storage medium having a plurality of instructions stored thereon that, when executed by the processor, causes the processor to:

receive self-organzing network (SON) capability information of a base station and an integration reference point agent (IRPAgent), wherein the SON capability information comprises a SON capability supported by the base station and the IRPAgent and an activation state of the SON capability indicating whether the SON capability is activated on the base station or the IRPAgent;

acquire a SON function selection policy;

determine whether there is a conflict among the IRPManager, the base station and the IRPAgent based on the SON capability information of the base station, the SON capability information of the IRPAgent and the SON function selection policy; and select a SON function based on the SON capability information of the base station, the SON capability information of the IRPAgent and the SON function selection policy when the IRPManager determines there is a conflict among the IRPManager, the base station and the IRPAgent.

6. The IRPManager according to claim 5 wherein the SON capability comprises a centralized SON function and/or a distributed SON function.

7. The IRPManager according to claim 6, wherein the centralized SON function comprises a centralized coverage and capacity optimization (CCO), a centralized energy saving (ES), a centralized automatic neighboring relation (ANR), a centralized mobility robustness optimization (MRO), a centralized mobility load balancing (MLB) and a centralized inter-cell interference control (ICIC).

8. The IRPManager according to claim 6, wherein the distributed SON function comprises a distributed CCO, a distributed ES, a distributed ANR, a distributed MRO, a distributed MLB, a distributed RACH optimization and a distributed ICIC.

9. A self-organizing network (SON) function selection system, comprising a base station, an integration reference point agent (IRPAgent) and an integration reference point manager (IRPManager),
- wherein the IRPManager comprises a processor and a non-transitory storage medium having a plurality of instructions stored thereon that, when executed by the processor, cause the processor to:
    - receive SON capability information of the base station and the IRPAgent, wherein the SON capability information comprises a SON capability supported by the base station and the IRPAgent and an activation state of the SON capability indicating whether the SON capability is activated on the base station or the IRPAgent;
    - acquire a SON function selection policy;
    - determine whether there is a conflict among the IRPManager, the base station and the IRPAgent based on the SON capability information of the base station, the SON capability information of the IRPAgent and the SON function selection policy; and
    - select a SON function based on the SON capability information of the base station, the SON capability information of the IRPAgent and the SON function selection policy when the IRPManager determines there is a conflict among the IRPManager, the base station and the IRPAgent,
- wherein the base station is configured to send the SON capability information of the base station to the IRPManager, and
- wherein the IRPAgent is configured to send the SON capability information of the IRPAgent to the IRPManager.

10. The SON function selection system according to claim 9, wherein the SON capability comprises a centralized SON function and/or a distributed SON function.

11. The SON function selection system according to claim 10, wherein the centralized SON function comprises a centralized coverage and capacity optimization (CCO), a centralized energy saving (ES), a centralized automatic neighboring relation (ANR), a centralized mobility robustness optimization (MRO), a centralized mobility load balancing (MLB) and a centralized inter-cell interference control (ICIC).

12. The SON function selection system according to claim 10, wherein the distributed SON function comprises a distributed CCO, a distributed ES, a distributed ANR, a distributed MRO, a distributed MLB, a distributed RACH optimization and a distributed ICIC.

* * * * *

UNITED STATES PATENT AND TRADEMARK OFFICE
CERTIFICATE OF CORRECTION

PATENT NO. : 9,769,736 B2  
APPLICATION NO. : 14/524588  
DATED : September 19, 2017  
INVENTOR(S) : Zou et al.

Page 1 of 1

It is certified that error appears in the above-identified patent and that said Letters Patent is hereby corrected as shown below:

Column 14, Line 42, "organzing" should read -- organizing --.

Signed and Sealed this  
Third Day of April, 2018

Andrei Iancu  
*Director of the United States Patent and Trademark Office*